United States Patent [19]
Bodor et al.

[11] Patent Number: 5,766,656
[45] Date of Patent: Jun. 16, 1998

[54] FRESH, RENNETED CAST CHEESE AND A METHOD OF MANUFACTURING

[75] Inventors: Janos Bodor, Rijswijk; Maria Anna Geluk, Schiedam, both of Netherlands

[73] Assignee: Unilever Patent Holdings B.V., Rotterdam, Netherlands

[21] Appl. No.: 537,818

[22] PCT Filed: Apr. 27, 1994

[86] PCT No.: PCT/EP94/01431

§ 371 Date: Jan. 11, 1996

§ 102(e) Date: Jan. 11, 1996

[87] PCT Pub. No.: WO94/24881

PCT Pub. Date: Nov. 10, 1994

[30] Foreign Application Priority Data

Apr. 27, 1993 [EP] European Pat. Off. ............. 93201211

[51] Int. Cl.[6] ...................... A23C 19/00; A23C 9/12
[52] U.S. Cl. .................... 426/8; 426/36; 426/38; 426/40; 426/399; 426/401; 426/409; 426/522; 426/582
[58] Field of Search .................... 426/8, 36, 38, 426/40, 399, 401, 409, 522, 582

[56] References Cited

U.S. PATENT DOCUMENTS

| 4,341,801 | 7/1982 | Weissman | 426/40 |
| 4,497,834 | 2/1985 | Barta | 426/42 |
| 4,581,240 | 4/1986 | Smith | 426/582 |
| 4,716,045 | 12/1987 | Prella | 426/63 |

FOREIGN PATENT DOCUMENTS

| 0 185 795 | 7/1986 | European Pat. Off. | A23C 19/076 |
| 2 405 655 | 5/1979 | France | A23C 19/02 |
| WO 85/00501 | 2/1985 | WIPO | A23C 19/00 |
| WO 92/06598 | 4/1992 | WIPO | A23C 19/09 |

OTHER PUBLICATIONS

Harris, Food Gels, pp. 58-59, 68-71, 86-87, 92-95.

*Primary Examiner*—David A. Redding
*Attorney, Agent, or Firm*—Cushman Darby & Cushman IP Group Pillsbury Madison & Sutro LLP

[57] ABSTRACT

A fresh renneted cheese having a pH value of 6.7 or below and in particular between 6.0 and 5.0 having a hydrocolloid structure which has not developed before the casein network of the cheese has developed. A method of preparing this cheese comprises adding a hydrocoloid before renneting but controlling the conditions such that the hydrocolloid network does not develop before the casein network.

9 Claims, No Drawings

FRESH, RENNETED CAST CHEESE AND A METHOD OF MANUFACTURING

This application claims benefit of international application 371 of PCT/EP94/01431 filed Apr. 27, 1994.

The invention relates to fresh, renneted cast cheese and to a method of manufacturing it at a pH value of 6.7 and below and in particular at pH values between 5.0 and 6.0 to improve the keepability thereof.

Such cheese making methods are generally known but usually are attended with syneresis which increases the more the pH value is lowered as compared with processes at higher pH values such as naturally occurring in milk. Such syneresis results in wheying off and corresponding protein losses.

Cast cheese for the purpose of this description and claims is a type of cheese made by clotting concentrated milk in the final package, which serves as a mould, without cutting the curd obtained in this way and without any other action disturbing the structure of this curd. The cast cheese is stored, distributed and sold in this package.

In particular when making cast cheese this syneresis is not only a loss but also annoying because the whey separates when the cast cheese is contained in the final package without any provision for removing this whey.

EP-A-185795 describes a preparation of cast cheese, wherein a starting mixture of an ultrafiltration retentate of skim milk, milk cream and Ricotta cheese is homogenised and sterilised, the mixture is conditioned hot in containers while adding sterile rennet, the containers are closed and allowed to age under conditions which cause coagulation of the casein, in particular at a temperature of 30°–40° C. between 1 and 3 hours. Hydrocolloids may be added to the starting mixture, for example 0.1–0.3 wt % of Na-alginate or carrageenan.

The invention aims at obtaining fresh, renneted cast cheese at pH values somewhat lower than those of natural milk as defined before while at least reducing syneresis and phenomena associated therewith like wheying off. The invention provides thereto a fresh, renneted cheese having a pH value of 6.7 or below and in particular between 5.0 and 6.0 which is characterized by a hydrocolloid structure which has not developed before the casein network has developed.

The existence of a casein network can easily be examined by microcopy. If renneting would occur at a too low temperature a hydrocolloid matrix might develop before the casein network whereby a rubbery texture would result, very unlike cheese.

Examples of suitable hydrocolloids being: agar-agar, xanthan-LBG mixture, gelatin, pectin, alginates, and gellan, although in practice agar-agar is preferred because of its temperature tolerance; agar-agar can be used at lower temperatures than other hydrocolloids and a preferred oral response is experienced at a given binding strength as compared with other hydrocolloids.

This invention is particularly suited for cast cheeses as stated before as it provides an opportunity of preventing or at least reducing considerable protein losses together with whey.

The invention also provides a method for preparing fresh, renneted cheese at a pH value of 6.7 and below and more preferred between 5.0 and 6.0. According to this invention this method comprises controlling the pH value of milk or concentrated milk at a value of 6.7 or below and in particular between 5.0 and 6.0, adding a sufficient amount of rennet or rennet-like milk curdling agent such as calf rennet, microbial rennet, chymosin, to effect curdling, adding at least an amount of gelling hydrocolloid sufficient for binding the amount of whey which otherwise would separate because of syneresis and effecting this addition before curdling, meanwhile controlling the conditions such that the hydrocolloid will not form a structure before the casein network has developed. A convenient manner of achieving this is keeping the temperature sufficient high to prevent the hydrocolloid from forming a structure.

Other preferred embodiments are described in the subclaims. Having described the invention and a method of putting it in practice in a general manner some detailed embodiments thereof will be described in the following examples for elucidation. In this specification and claims parts, ratios and percentages relate to weights unless otherwise indicated.

EXAMPLE I

A concentrated milk is prepared at 90° C., containing 28.41 kg 6× concentrated skim milk, 3.89 kg water, 7.2 kg milk fat, 0.5 kg salt and 0.2 kg agar-agar and quickly cooled down to 48° C. At this temperature 0.006 kg glucono delta lactone (GDL) and 0.01% rennet (strength 1:10 800) are added. This mixture is filled into packages of 100 ml capacity and kept at a temperature between 46° and 50° C. for one hour. Thereafter the filled packages are stored at a storage temperature of 5° C. A well structured fresh cast cheese is obtained without any signs of wheying off.

EXAMPLE II

The procedure of Example I is repeated, however without the addition of GDL. A neutral fresh cast cheese is obtained having a good structure. No signs of wheying off are observed.

EXAMPLE III

The procedure of Example I is repeated however without th addition of agar-agar. A fresh cast cheese is obtained showing considerable wheying off.

The products of Examples I, II and III are subjected to a standardized syneresis test.

100 g of the products are cast in slightly tapering round tubs, having a bottom diameter of 60 mm, an upper diameter of 66 mm and a height of 33 mm.

Cut the cheese vertically in two equal parts, remove one and reclose the tubs. Store these tubs 3 days at 5° C. Open tubs, determine syneresis surface $A_2$, determine weight of filled tub ($B_2$), decant separated whey and determine its weight ($W_2$) empty tub and determine its weight C and calculate syneresis $S_2$ using the formula:

$$S_2 = \frac{W_2 \times 100}{(B_2 - C)A_2} \quad (\%/cm^2)$$

Results being as follows:

Example I <1%/cm$^2$

Example II <1%/cm$^2$

Example III 5–6.5%/cm$^2$

We claim:

1. A fresh, renneted cast cheese having a pH value of 6.7 or below wherein said cast cheese is made by clotting concentrated milk in the final package, which serves as a mould, without cutting the curd obtained in this way and without any other action disturbing the structure of this curd, said cheese being characterized by a hydrocolloid structure which was developed after the casein network of the cheese was developed.

2. Cheese according to claim 1 wherein the hydrocolloid structure is formed using agar-agar.

3. A cast cheese according to claim 1 having a pH between 5.0 and 6.0.

4. A cast cheese according to claim 3 which is characterized by reduced separation of whey and syneresis.

5. In a method of preparing fresh, renneted cast cheese having a pH value of 6.7 or below wherein the cast cheese is made by clotting concentrated milk in the final package, which serves as a mould, without cutting the curd obtained in this way and without any other action disturbing the structure of this curd, the improvement comprising maintaining the pH value of the milk or concentrated milk to be curdled at a value of 6.7 or below, adding a sufficient amount of rennet or a rennet-like milk curdling agent to effect curdling, adding a gelling hydrocolloid in at least an amount sufficient to bind the amount of whey which would otherwise separate because of syneresis and effecting this addition before curdling while controlling the curdling conditions such that the hydrocolloid does not form a structure before the casein network resulting from curdling has developed whereby separation of whey and syneresis in the resulting cast cheese are reduced.

6. The method of claim 5 wherein the hydrocolloid is added before a heat treatment.

7. The method of claim 6 wherein the heat treatment comprises pasteurisation, thermisation or ultrafiltration at elevated temperature or homogenisation.

8. The method of claim 5 wherein the curdling is carried out at a pH of 5.0–6.0.

9. The method of claim 8 wherein the hydrocolloid is agar-agar and the curdling is carried out at a temperature of 46°–50° C. for about an hour after which the resulting package is stored.

* * * * *